US012777081B2

(12) United States Patent
Graves et al.

(10) Patent No.: US 12,777,081 B2
(45) Date of Patent: Oct. 27, 2026

(54) ENABLING A WIDEBAND CODEC AUDIO CALL BETWEEN A MOBILE DEVICE AND A WIRELESS TELECOMMUNICATION NETWORK SUPPORT CENTER

(71) Applicant: T-Mobile USA, Inc., Bellevue, WA (US)

(72) Inventors: Brian Graves, Kenmore, WA (US); Jeremy Wu, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 153 days.

(21) Appl. No.: 18/940,604

(22) Filed: Nov. 7, 2024

(65) Prior Publication Data

US 2025/0063072 A1 Feb. 20, 2025

Related U.S. Application Data

(63) Continuation of application No. 18/072,566, filed on Nov. 30, 2022, now Pat. No. 12,143,428.

(51) Int. Cl.

*H04L 65/1069* (2022.01)
*H04L 65/1046* (2022.01)
*H04M 3/51* (2006.01)

(52) U.S. Cl.

CPC ...... *H04L 65/1069* (2013.01); *H04L 65/1046* (2013.01); *H04M 3/5166* (2013.01)

(58) Field of Classification Search

CPC ............ H04L 65/1069; H04L 65/1046; H04M 3/5166

See application file for complete search history.

(56) References Cited

U.S. PATENT DOCUMENTS

| | | | |
|---|---|---|---|
| 6,115,461 | A | 9/2000 | Baiyor et al. |
| 6,185,288 | B1 | 2/2001 | Wong |
| 6,307,929 | B1 | 10/2001 | Baiyor et al. |
| 6,351,762 | B1 | 2/2002 | Ludwig et al. |
| 6,366,660 | B1 | 4/2002 | Baiyor et al. |
| 6,421,324 | B1 | 7/2002 | Boyle et al. |
| 6,445,915 | B1 | 9/2002 | Baiyor et al. |
| 6,574,325 | B1 | 6/2003 | Baiyor et al. |
| 6,597,687 | B1 | 7/2003 | Rao |
| 6,600,738 | B1 | 7/2003 | Alperovich et al. |

(Continued)

FOREIGN PATENT DOCUMENTS

| | | | |
|---|---|---|---|
| CN | 203289656 | U | 11/2013 |
| CN | 106657568 | B | 8/2019 |

(Continued)

*Primary Examiner* — Bryan Y Lee

(74) *Attorney, Agent, or Firm* — Ashurst Perkins Coie US LLP

(57) ABSTRACT

The disclosed system enables a wideband codec audio call between a mobile device and a wireless telecommunication network support center by ensuring that multiple components of the network participating in the call and multiple legs that make up the call all communicate using the same wideband codec. A leg among the multiple legs is a connection between two components participating in the call. While all the legs making up the call between the caller and the callee have to be wideband, the system can enable any branching legs in the call, for example, those directed to a third party, to be either wideband or narrowband.

20 Claims, 6 Drawing Sheets

(56) References Cited

U.S. PATENT DOCUMENTS

| | | | |
|---|---|---|---|
| 6,606,305 | B1 | 8/2003 | Boyle et al. |
| 6,614,781 | B1 | 9/2003 | Elliott et al. |
| 6,714,636 | B1 | 3/2004 | Baiyor et al. |
| 6,731,625 | B1 | 5/2004 | Eastep et al. |
| 6,785,885 | B2 | 8/2004 | Norris et al. |
| 6,798,786 | B1 | 9/2004 | Lo et al. |
| 6,853,719 | B2 | 2/2005 | Mccormack et al. |
| 6,856,612 | B1 | 2/2005 | Bjelland et al. |
| 6,956,939 | B1 | 10/2005 | Boland et al. |
| 6,977,898 | B1 | 12/2005 | Miriyala |
| 6,996,221 | B1 | 2/2006 | Baiyor et al. |
| 7,050,563 | B2 | 5/2006 | Dammrose |
| 7,050,813 | B1 | 5/2006 | Paiz |
| 7,068,759 | B2 | 6/2006 | Dammrose |
| 7,167,451 | B1 | 1/2007 | Oran |
| 7,340,049 | B2 | 3/2008 | Batni et al. |
| 7,366,513 | B2 | 4/2008 | Segal et al. |
| 7,397,775 | B2 | 7/2008 | Womack et al. |
| 7,453,869 | B1 | 11/2008 | Paterik |
| 7,466,991 | B2 | 12/2008 | Everson et al. |
| 7,469,299 | B2 | 12/2008 | Johnston |
| 7,477,282 | B2 | 1/2009 | Firestone et al. |
| 7,542,768 | B2 | 6/2009 | Florkey et al. |
| 7,620,052 | B2 | 11/2009 | Witzel et al. |
| 7,729,339 | B2 | 6/2010 | Patfield |
| 7,733,850 | B1 | 6/2010 | Croak et al. |
| 7,746,849 | B2 | 6/2010 | Bodin et al. |
| 7,773,735 | B2 | 8/2010 | Rudolph |
| 7,808,988 | B2 | 10/2010 | Neff |
| 7,822,186 | B1 | 10/2010 | Boni |
| 7,843,831 | B2 | 11/2010 | Morrill et al. |
| 7,843,899 | B2 | 11/2010 | Burritt |
| 7,876,888 | B2 | 1/2011 | Chatterjee et al. |
| 7,885,208 | B2 | 2/2011 | Mutikainen et al. |
| 7,889,849 | B2 | 2/2011 | Chatterjee et al. |
| 7,945,039 | B1 | 5/2011 | Malagon et al. |
| 7,961,714 | B1 | 6/2011 | Watson et al. |
| 7,974,618 | B2 | 7/2011 | Silver |
| 7,986,644 | B2 | 7/2011 | Frankel |
| 7,986,665 | B2 | 7/2011 | Kezys et al. |
| 8,085,906 | B2 | 12/2011 | Park et al. |
| 8,139,729 | B2 | 3/2012 | Phelps et al. |
| 8,208,413 | B1 | 6/2012 | Bienn et al. |
| 8,208,931 | B2 | 6/2012 | Gupta et al. |
| 8,223,948 | B2 | 7/2012 | Minert et al. |
| 8,233,400 | B2 | 7/2012 | Sardesai et al. |
| 8,244,229 | B2 | 8/2012 | Lindfors et al. |
| 8,265,696 | B1 | 9/2012 | Verkama |
| 8,275,110 | B2 | 9/2012 | Vendrow |
| 8,335,187 | B2 | 12/2012 | Wilhoite et al. |
| 8,369,508 | B2 | 2/2013 | Cohen et al. |
| 8,433,050 | B1 | 4/2013 | Baten et al. |
| 8,477,614 | B2 | 7/2013 | Wiley et al. |
| 8,483,699 | B1 | 7/2013 | Oroskar |
| 8,548,460 | B2 | 10/2013 | Wang et al. |
| 8,675,853 | B1 | 3/2014 | Guilfoyle |
| 8,751,223 | B2 | 6/2014 | Hiltner et al. |
| 8,811,381 | B2 | 8/2014 | Verbil et al. |
| 8,867,731 | B2 | 10/2014 | Lum et al. |
| 9,270,932 | B2 | 2/2016 | Mn |
| 9,277,057 | B2 | 3/2016 | Rabipour et al. |
| 9,307,370 | B1 | 4/2016 | Pai et al. |
| 9,307,401 | B2 | 4/2016 | De Simone et al. |
| 9,307,466 | B2 | 4/2016 | Li et al. |
| 9,319,531 | B1 | 4/2016 | Capper et al. |
| 9,326,114 | B2 | 4/2016 | Lazaridis et al. |
| 9,379,909 | B2 | 6/2016 | Lee et al. |
| 9,408,241 | B2 | 8/2016 | Ku et al. |
| 9,456,075 | B2 | 9/2016 | Ponting et al. |
| 9,473,644 | B2 | 10/2016 | Wah et al. |
| 9,584,574 | B2 | 2/2017 | Witzel et al. |
| 9,706,045 | B2 | 7/2017 | Allen et al. |
| 9,706,266 | B1 | 7/2017 | Wageman |
| 9,712,674 | B2 | 7/2017 | Phelps et al. |
| 9,729,601 | B2 | 8/2017 | Reddappagari et al. |
| 9,755,789 | B2 | 9/2017 | Panattu et al. |
| 9,807,732 | B1 | 10/2017 | Clark et al. |
| 9,826,096 | B1 | 11/2017 | Slade |
| 9,854,421 | B2 | 12/2017 | Mahdi |
| 9,900,082 | B1 | 2/2018 | Chowdhury et al. |
| 9,930,088 | B1 | 3/2018 | Hodge |
| 9,936,066 | B1 | 4/2018 | Mammen et al. |
| 9,961,116 | B2 | 5/2018 | Prajapat |
| 10,015,664 | B2 | 7/2018 | Lau et al. |
| 10,097,594 | B1 | 10/2018 | Filart |
| 10,110,748 | B2 | 10/2018 | Mumick et al. |
| 10,938,991 | B2 | 3/2021 | Naidu et al. |
| 11,178,286 | B2 | 11/2021 | Patel et al. |
| 11,496,918 | B2 | 11/2022 | Amin et al. |
| 12,603,922 | B2 * | 4/2026 | Bonja .................. H04L 65/104 |
| 2004/0002339 | A1 | 1/2004 | Oconnor |
| 2004/0022237 | A1 | 2/2004 | Elliott et al. |
| 2004/0180654 | A1 | 9/2004 | Chen |
| 2005/0096006 | A1 | 5/2005 | Chen et al. |
| 2006/0072546 | A1 | 4/2006 | Chen |
| 2006/0077956 | A1 | 4/2006 | Saksena et al. |
| 2006/0077957 | A1 | 4/2006 | Reddy et al. |
| 2007/0070980 | A1 | 3/2007 | Phelps et al. |
| 2007/0111752 | A1 | 5/2007 | Pazhyannur |
| 2007/0133516 | A1 | 6/2007 | Stein |
| 2007/0171898 | A1 | 7/2007 | Salva |
| 2008/0037533 | A1 | 2/2008 | Wah et al. |
| 2008/0075065 | A1 | 3/2008 | Reuss et al. |
| 2009/0076802 | A1 | 3/2009 | Witzel et al. |
| 2009/0109969 | A1 * | 4/2009 | Cotignola .......... H04Q 11/0471 375/240 |
| 2011/0294501 | A1 | 12/2011 | Wang et al. |
| 2013/0157674 | A1 | 6/2013 | Jylha-Ollila et al. |
| 2015/0023258 | A1 | 1/2015 | Hu et al. |
| 2015/0033300 | A1 | 1/2015 | Timariu et al. |
| 2015/0038134 | A1 | 2/2015 | Cheng |
| 2015/0045041 | A1 | 2/2015 | Polisetty et al. |
| 2017/0104647 | A1 | 4/2017 | Chaiyochlarb et al. |
| 2017/0231014 | A1 | 8/2017 | Patel et al. |
| 2017/0237851 | A1 | 8/2017 | Hassan et al. |
| 2018/0176266 | A1 | 6/2018 | Filart |
| 2022/0021713 | A1 | 1/2022 | Persson et al. |
| 2022/0180883 | A1 | 6/2022 | Chiang et al. |

FOREIGN PATENT DOCUMENTS

| | | | |
|---|---|---|---|
| CN | 114697926 | A | 7/2022 |
| EP | 0950308 | A2 | 10/1999 |
| EP | 1016262 | A1 | 7/2000 |
| EP | 1155559 | A1 | 11/2001 |
| EP | 1797703 | A2 | 6/2007 |
| EP | 1874019 | A2 | 1/2008 |
| EP | 2022284 | A1 | 2/2009 |
| EP | 2033387 | A1 | 3/2009 |
| EP | 2224719 | A1 | 9/2010 |
| EP | 1638286 | B1 | 12/2011 |
| EP | 2375716 | B1 | 5/2012 |
| EP | 1982470 | B1 | 4/2014 |
| EP | 3162051 | A1 | 5/2017 |
| EP | 3028239 | B1 | 9/2018 |
| EP | 3440857 | A1 | 2/2019 |
| JP | 4094463 | B2 | 3/2008 |
| JP | 5044380 | B2 | 7/2012 |
| KR | 100747709 | B1 | 8/2007 |
| KR | 100882795 | B1 | 2/2009 |
| KR | 100964465 | B1 | 6/2010 |
| KR | 101990884 | B1 | 6/2019 |
| KR | 102049279 | B1 | 11/2019 |
| WO | 2004015969 | A1 | 2/2004 |
| WO | 2007007090 | A1 | 1/2007 |
| WO | 2007091787 | A1 | 8/2007 |
| WO | 2007109805 | A2 | 9/2007 |
| WO | 2011046439 | A1 | 4/2011 |
| WO | 2011150104 | A1 | 12/2011 |
| WO | 2012175964 | A2 | 12/2012 |
| WO | 2020081614 | A1 | 4/2020 |
| WO | 2020119676 | A1 | 6/2020 |

* cited by examiner

ENABLING A WIDEBAND CODEC AUDIO CALL BETWEEN A MOBILE DEVICE AND A WIRELESS TELECOMMUNICATION NETWORK SUPPORT CENTER

CROSS-REFERENCE TO RELATED APPLICATIONS

This application is a continuation of U.S. patent application Ser. No. 18/072,566, filed Nov. 30, 2022, which is hereby incorporated by reference in its entirety.

BACKGROUND

Narrowband signals are signals that occupy a narrow range of frequencies or that have a small fractional bandwidth. In the audio spectrum, narrowband codec ("narrowband") sounds are sounds that occupy a narrow range of frequencies. In telephony, narrowband is usually considered to cover frequencies 300-3400 Hz, i.e., the voiceband. This spectrum allows for speech to traverse but nothing else. Public switched telephone network phones, e.g., regular telephony, and most cellular networks operate using the narrowband. However, the narrowband codec provides low audio quality, which makes the conversation hard to understand for both human and machine participants, thus causing frustration and system inefficiencies such as inaccurate transcription or network congestion due to repeated calls regarding the same issue.

BRIEF DESCRIPTION OF THE DRAWINGS

Detailed descriptions of implementations of the present invention will be described and explained through the use of the accompanying drawings.

Figure 1:
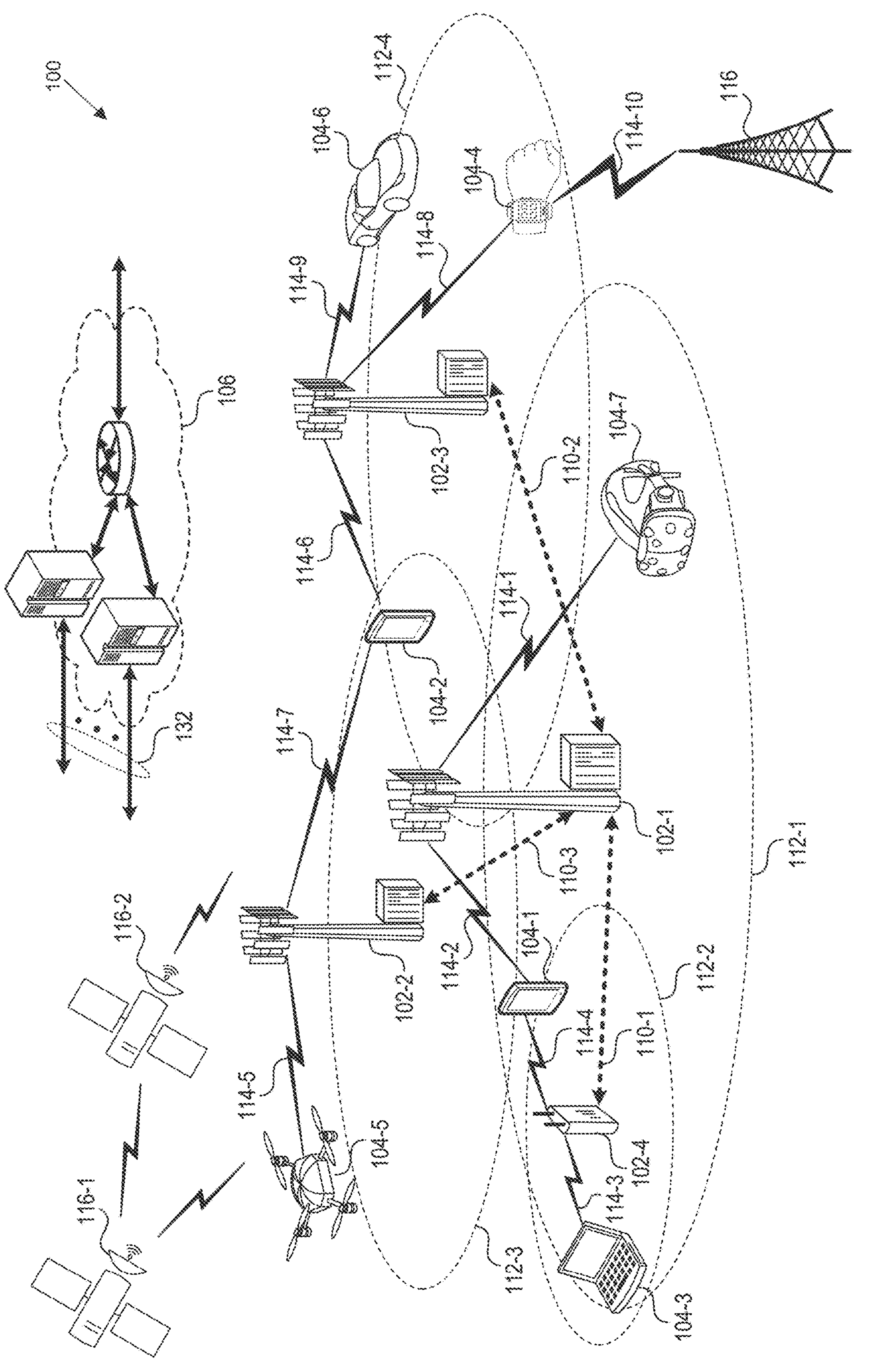
FIG. 1 is a block diagram that illustrates a wireless telecommunication network in which aspects of the disclosed technology are incorporated.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed system enables a wideband codec audio call between a mobile device and a wireless telecommunication network ("network") support center by ensuring that multiple components of the network participating in the call and creating multiple legs that make up the call all communicate using the same wideband codec. A leg among the multiple legs is a connection between two components participating in the call. While all the legs making up the call between the caller and the callee have to be wideband for the system to provide wideband audio quality, the system can enable any branching legs in the call, directed to a third party, to be either wideband or narrowband.

The system creates a first leg of a call by receiving a call from a mobile device at a cell site associated with the wireless telecommunication network, where the call conforms to a radio network protocol, such as the 5G or later generation as defined by the 3GPP. The cell site associated with the wireless telecommunication network converts the call conforming to the radio network protocol into multiple packets, where a packet among the multiple packets conforms to a packet format configured to be transmitted over an Internet Protocol (IP) network associated with the wireless telecommunication network. For example, an eNodeB associated with the cell sites can convert the radio network protocol call into the IP packet format.

The system creates a second leg of the call by sending the multiple packets to a mobile network core associated with the wireless telecommunication network. The mobile network core determines that the call is directed to the wireless telecommunication network support center and creates a third leg of the call by routing the call to an Interconnect Session Border Controller (I-SBC) associated with the wireless telecommunication network, where the I-SBC is peered with a Session Border Controller (SBC). The I-SBC typically sits on the border between two IP Multimedia Subsystem (IMS) or Session Initiation Protocol (SIP) networks. In this role, the I-SBC conducts a variety of functions, including security, traffic scrubbing, address manipulation and media transcoding (amongst other functions).

The system creates a fourth leg of the call by routing, by the I-SBC, the call to the SBC. The SBC determines that the call is directed to the wireless telecommunication network support center. The SBC creates a fifth leg of the call by routing the call to the call routing platform. The call routing platform creates a sixth leg of the call by routing the call to an interactive voice response (IVR). The mobile device can interact with the IVR and can resolve the issue without ever reaching the agent. Alternatively, the mobile device can indicate to the IVR to connect the mobile device to an agent by, for example, providing a signal indicating a user selecting a predetermined button.

The IVR can determine that the mobile device is requesting to communicate with an agent associated with the wireless telecommunication network. The agent can be a person or an artificial intelligence (AI). Upon making the determination, the IVR transfers the call to the call routing platform. The call routing platform creates a seventh leg of the call by routing the call to the agent associated with the wireless telecommunication network. The system establishes the wideband codec audio communication associated with the first leg, the second leg, the third leg, the fourth leg, the fifth leg, and the seventh leg of the call, where the wideband codec audio communication uses a greater frequency range of the audio spectrum compared to a narrowband codec. For example, the narrowband codec transmits audio frequency in the range 300-3400 Hz, while the wideband codec transmits in the audio frequency range of 50 Hz-7000 Hz.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, IP connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station as compared to a macro cell and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, in order to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100, including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple subcarriers (e.g., waveform signals of different frequencies) modulated according to the various radio technologies. Each modulated signal can be sent on a different subcarrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multipath environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
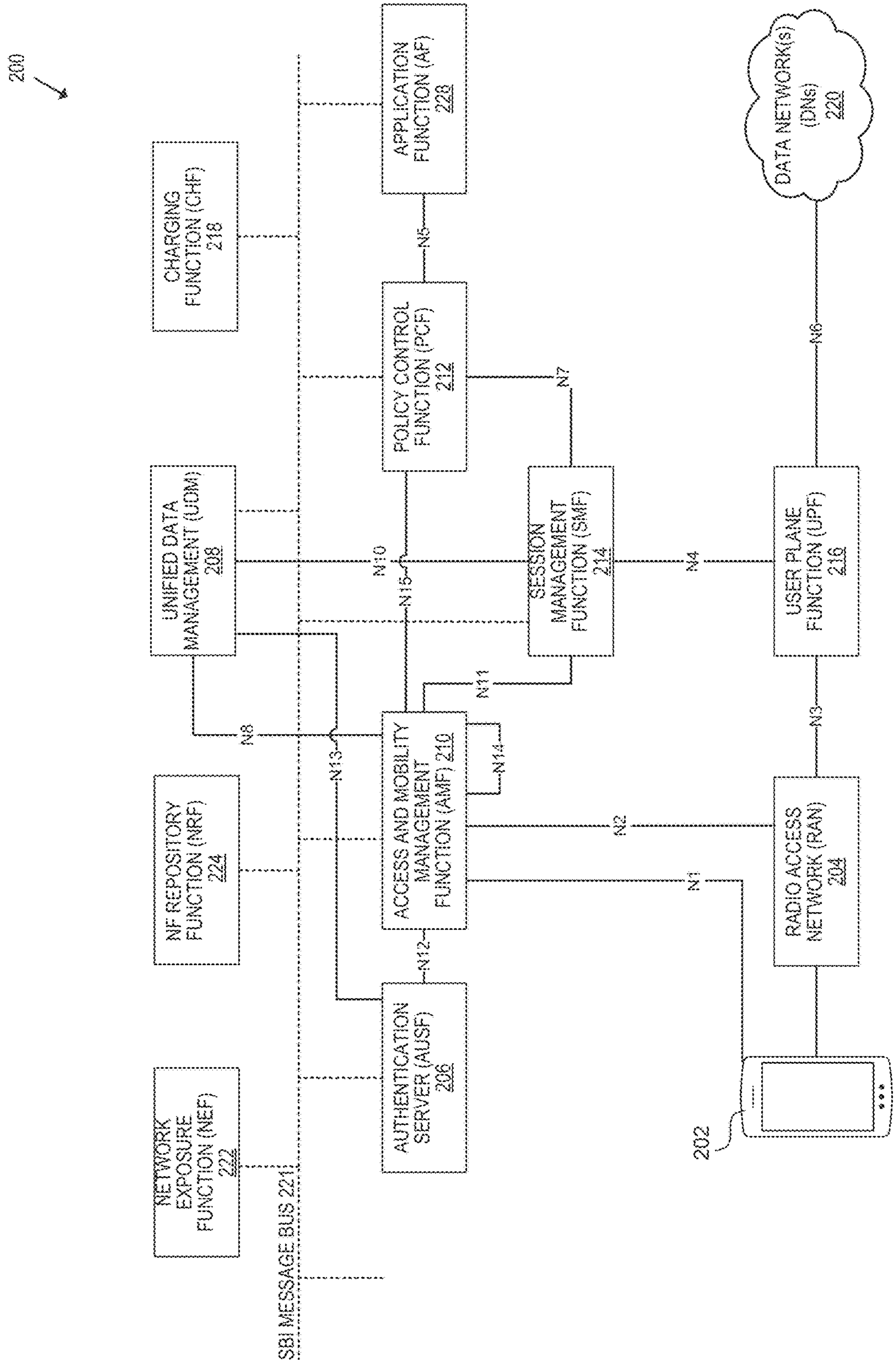
FIG. 2 is a block diagram that illustrates an architecture including 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF), and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, and service-level agreements, and it includes the virtualized resources required to service the needs of a Mobile Virtual Network Operator (MVNO) or group of subscribers, including a dedicated UPF, SMF, and PCF. The wireless device 202 is associated with one or more network slices that all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of NFs, once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Figure 3:
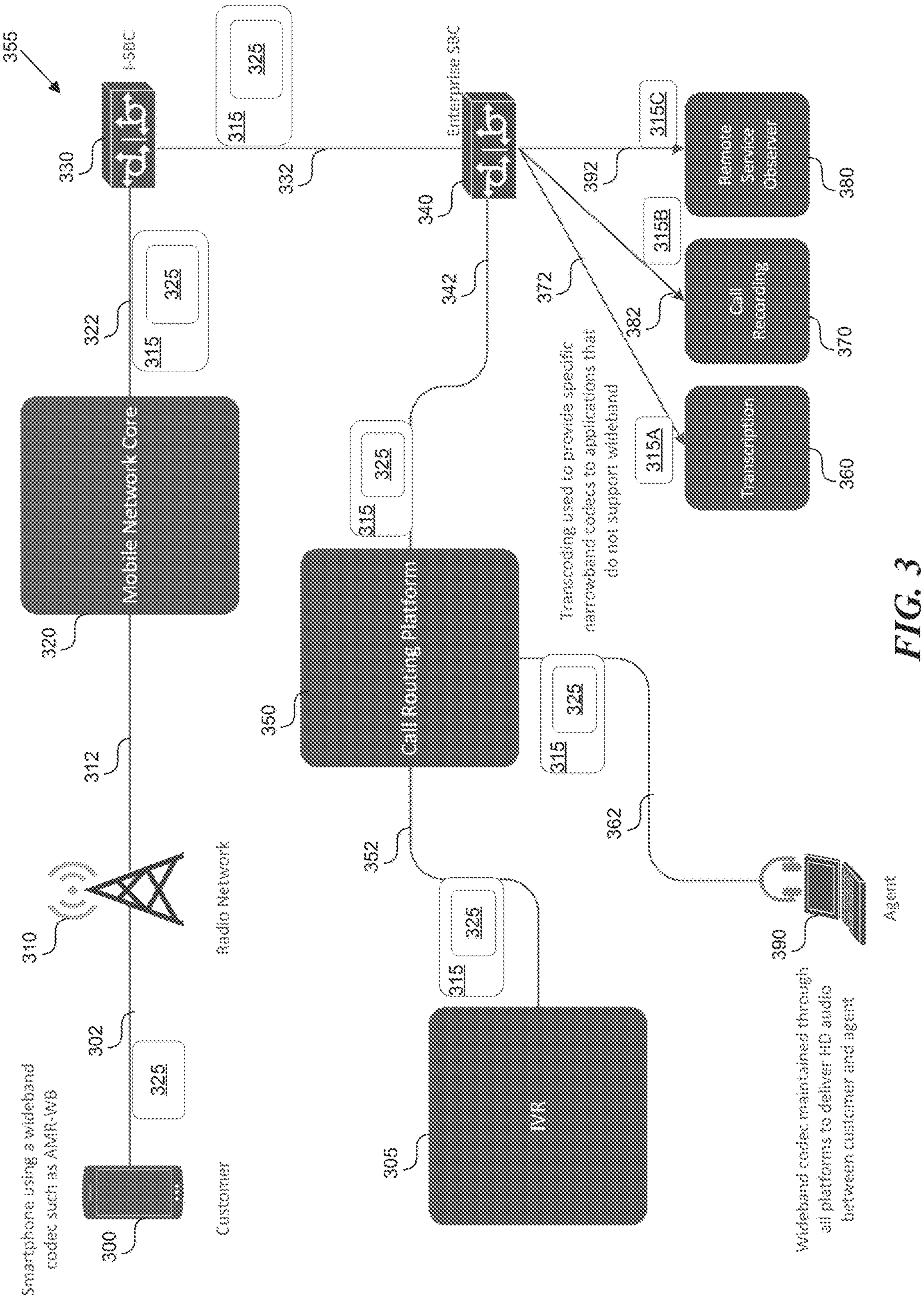
FIG. 3 shows a system to enable a wideband codec audio call between a user equipment (UE) and a wireless telecommunication network support center.

Enabling a Wideband Codec Audio Call Between a Mobile Device and a Wireless Telecommunication Network Support Center FIG. 3 shows a system to enable a wideband codec audio call between a UE and a wireless telecommunication network support center. The UE 300 can place a call to the network 100, such as a 5G network. The network 100 can include a cell site 310, mobile network core 320, I-SBC 330, Enterprise SBC 340, call routing platform 350, transcription 360, call recording 370, remote service observer 380, agent 390, and optionally IVR 305. Alternatively, the IVR 305 can be a part of a third-party system.

The cell site 310 can receive a call 325 from the UE 300 by establishing connection 302. The call 325 can conform to a radio network protocol and can be received over radio waves. The cell site 310 can include an eNodeB that can convert the call 325 conforming to the radio network protocol into multiple IP packets 315. The cell site 310 can transmit the IP packets 315 to mobile network core 320 by establishing connection 312.

The mobile network core 320 can determine that that call 325 is directed to a network support center including the agent 390. The agent 390 can be an AI or a person handling the call 325. The mobile network core 320 can forward the call 325 using the connection 322 to I-SBC 330.

An I-SBC 330 typically sits on the border between two IMS or SIP networks. In this role, the I-SBC 330 conducts a variety of functions, including security, traffic scrubbing, header manipulation and media transcoding (amongst other functions). The I-SBC 330 is peered with the enterprise SBC 340 and can forward the call 325 via the connection 332.

An SBC 340 is a network element deployed to protect SIP-based voice over Internet Protocol (VoIP) networks. The SBC 340 can be deployed between two service provider networks in a peering environment. In addition, the SBC 340 can be deployed between a service provider's access network and a backbone network to provide service to residential and/or enterprise customers.

The term "session" refers to a communication between two or more parties—in the context of telephony, this would be the call 325. Each call 325 consists of one or more call signaling message exchanges that control the call and one or more call media streams that carry the call's audio, video, or other data along with information of call statistics and quality. Together, these streams make up a session. SBC 340 can exert influence over the data flows of sessions.

The term "border" refers to a point of demarcation between one part of a network and another. As a simple example, at the edge of a corporate network, a firewall demarcates the local network (inside the corporation) from the rest of the Internet (outside the corporation). A more complex example is that of a large corporation where different departments have security needs for each location and perhaps for each kind of data. In this case, filtering routers or other network elements are used to control the flow of data streams. The SBC 340 can assist policy administrators in managing the flow of session data across these borders.

The term "controller" refers to the influence that SBC 340 has on the data streams that comprise sessions, as they traverse borders between one part of a network and another. Additionally, SBC 340 can provide measurement, access control, and data conversion facilities for the calls 325 they control.

The SBC 340 can determine where to send the call 325 by determining the endpoint of the call, such as a network support center. Consequently, the SBC 340 sends the call 325 to the call routing platform 350 by establishing connection 342. Calls directed to network support center can be routed by the call routing platform 350. Other calls placed from the UE 300, such as to another UE, do not route through 350. The call routing platform 350 can add some enhanced data to the call 325 and send the call to the IVR 305. Enhanced data can include account number, customer type, MSISDN (mobile number) etc.

The IVR 305, which can be part of the network 100 or separate, can interact with the UE 300. The UE 300 can interact with the IVR 305 to self-serve, and interaction between the IVR 305 and the UE 300 can be completed without routing the call to the agent 390. The UE 300 can choose to interact with the agent and can indicate to the IVR 305 to transfer the call to the agent 390 by, for example, pressing a predetermined button such as 1. The IVR 305 can transfer the call 325 to the routing platform 350. The routing platform 350 can select the proper agent 390 for the for the UE 300 and can connect the call 325 to the agent via connection 362.

While the call 325 between the UE 300 and the agent 390 is going on, the call routing platform 350 can simultaneously forward the call to the SBC 340. The SBC 340 can establish simultaneous connections to multiple different endpoints 360, 370, 380 by, for example, copying the multiple packets 315 carrying the call 325 and sending the copies 315A, 315B, 315C through the connections 372, 382, 392 to multiple different endpoints.

The endpoints 360, 370, 380 can include transcription, call recording, and remote service observers. Transcription 360 can transcribe the voice call into text. Call recording 370 can record the voice call for later retrieval. The remote service observer 380 can be an agent of the quality team scoring the interaction in the call 325, or it can be the agent 390's coach. For example, the agent 390 can request help from the coach, and the coach can listen to the live call and provide feedback.

Currently, at least one leg 302, 312, 322, 332, 342, 362 of the call 325 between the UE 300 and the agent 390 uses a narrowband codec specified in G.711. G.711 passes audio signals in the range of 300-3400 Hz and samples them at the rate of 8,000 samples per second, with the tolerance on that rate of 50 parts per million (ppm). The narrowband codec reduces the quality of the audio, compared to the wideband codec in which certain sounds are easily confused, such as "S" and "F", and "M" and "N."

In contrast, wideband codecs, including super wideband codecs, relax the bandwidth limitation and transmit in the audio frequency range of 50 Hz to 7 kHz. In addition, some wideband codecs may use a higher audio bit depth of 16 bits to encode samples, also resulting in much better voice quality. Wideband codecs have a typical sample rate of 16 kHz. For superwideband codecs the typical value is 32 kHz. There are multiple wideband codecs. For a wideband codec to work, both the sender and the receiver need to operate using the same codec. This wideband codec synchronization requirement presents a problem when not all legs of the call are operated by the same network. For example, for the call leg 302 to be wideband, both the UE 300 and the cell site 310 need to use the same codec. If at least one leg 302, 312, 322, 332, 342, 362 of the call 325 is narrowband, then the whole call is narrowband, and the quality of the whole call is degraded.

The network 100 can upgrade all the legs 302, 312, 322, 332, 342, 362, 372, 382, 392 of the call 325 to use the same wideband codec because the network controls all the legs of the call. Traditionally the calls to network support centers including the agent 390 are narrowband calls even when the network 100 controls all the legs of the call 325, because at least a portion of the legs 372, 382, 392 are narrowband. The disclosed system 355 enables all the legs 302, 312, 322, 332, 342, 362 between two endpoints 300, 390 to be wideband, while some of the legs 372, 382, 392, which are branching copies of the call 325, can be narrowband. Since the legs 372, 382, 392 do not contribute to the communication between the UE 300 and the agent 390, the legs 372, 382, 392 can be narrowband, while the call 325 can be wideband.

For example, the connection 382 to call recording 370 can be a narrowband connection because the call recording 370 records the lower quality calls for memory reasons. Storing a narrowband, e.g., low-definition, call requires 10 times less memory than storing a wideband, e.g., high-definition, call. Using the current system 355, the connection 382 can be a narrowband connection, while the connections 302, 312, 322, 332, 342, 362 remain wideband.

In another example, a component of the IVR 305 may not support the wideband codec. Consequently, the disclosed system 355 can allow the connection 352 to be narrowband, while preserving connections 302, 312, 322, 332, 342, 362 as wideband. As a result, the disclosed system 355 allows a mix of narrowband in wideband connections.

In one embodiment, when the UE 300 interacts with the IVR 305, the legs 302, 312, 322, 332, 342, 352 can be narrowband because the IVR platform does not support wideband codec. When the IVR 305 transfers the call 325 to the call routing platform 350, the system 355 can renegotiate the codec used on legs 302, 312, 322, 332, 342, and upgrade the codec from narrowband to wideband. One or more of the connections 372, 382, 392 can be narrowband, or they can all be wideband.

Figure 4A:
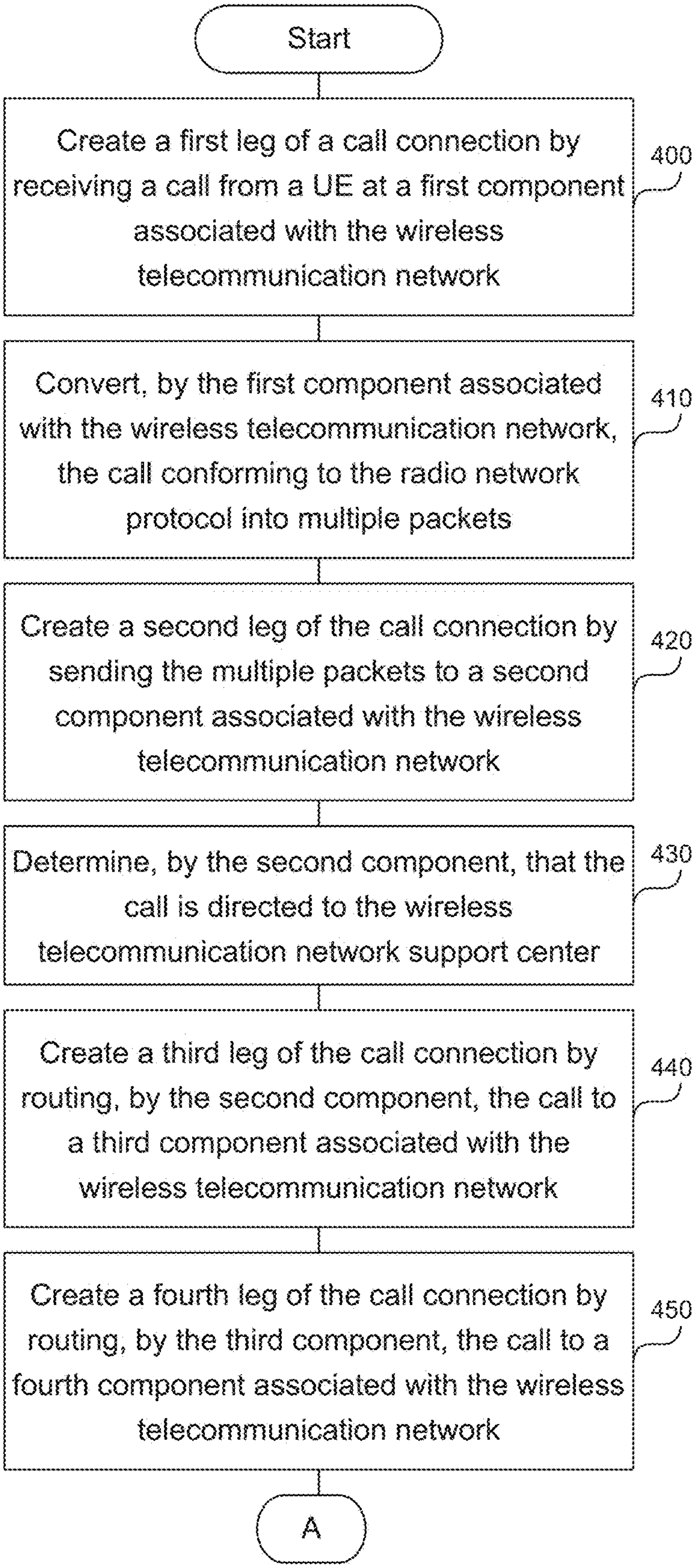
FIGS. 4A-4B are flowcharts of a method to enable a wideband codec audio call between a mobile device and a wireless telecommunication network support center.
Figure 4B:
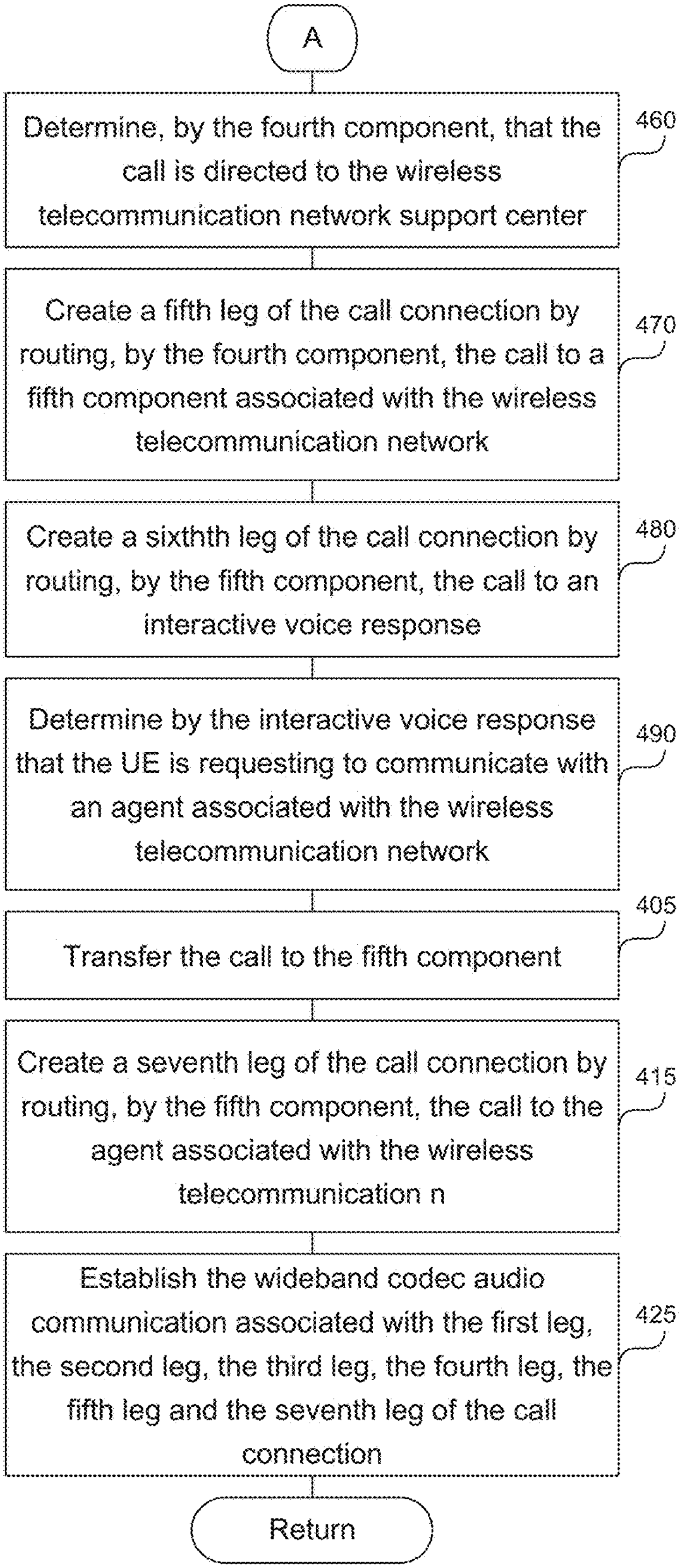

FIGS. 4A-4B is a flowchart of a method to enable a wideband codec audio call between a mobile device and a wireless telecommunication network support center. A hardware or a software processor executing instructions described in this application can, in step 400, create a first leg of a call by receiving a call from a UE at a first component associated with the wireless telecommunication network, where the call conforms to a radio network protocol. The first component can be a cell site.

Note that the numbering of the components and call legs may change in the claims in an effort to make the numbering always starts with first, however, the function performed by components and call legs remains the same. For example, in a statement "an IVR configured to receive the call from a second component," the second component refers to the call routing platform 350 in FIG. 3 because the IVR receives the calls only from the call routing patent platform in FIG. 3.

In step 410, the processor can convert the call conforming to the radio network protocol into multiple packets, where a packet among the multiple packets conforms to a packet format configured to be transmitted over an IP network associated with the wireless telecommunication network.

In step 420, the processor can create a second leg of the call by sending the multiple packets to a second component associated with the wireless telecommunication network. The second component can be a mobile network core.

In step 430, the processor can determine that the call is directed to the wireless telecommunication network support center. In step 440, the processor can create a third leg of the call by routing the call to a third component associated with the wireless telecommunication network. The third component can be an I-SBC.

In step 450, the processor can create a fourth leg of the call by routing the call to a fourth component associated with the wireless telecommunication network. The fourth component can be an SBC.

In step 460, the processor can determine that the call is directed to the wireless telecommunication network support center. In step 470, the processor can create a fifth leg of the call by routing the call to a fifth component associated with the wireless telecommunication network. The fifth component can be a call routing platform. In step 480, the processor can create a sixth leg of the call by routing the call to an IVR.

In step 490, the processor can determine that the UE is requesting to communicate with an agent associated with the wireless telecommunication network. In step 405, the processor can transfer the call to the fifth component. In step 415, the processor can create a seventh leg of the call by routing the call to the agent associated with the wireless telecommunication network.

In step 425, the processor can establish the wideband codec audio communication associated with the first leg, the second leg, the third leg, the fourth leg, the fifth leg, and the seventh leg of the call. The wideband codec audio communication uses a greater frequency range of the audio spectrum compared to a narrowband codec. The narrowband codec transmits audio frequency in the range 300-3400 Hz, while the wideband codec transmits in the audio frequency range of 50 Hz-7000 Hz.

Even if the first leg, the second leg, the third leg, the fourth leg, the fifth leg, and the seventh leg of the call are wideband, the sixth leg of the call can be narrowband. The processor can receive an indication that the IVR is configured to operate in the narrowband codec. The processor can establish a narrowband codec audio communication associated with the first leg, the second leg, the third leg, the fourth leg, the fifth leg, and the sixth leg of the call. Upon transferring the call to the fifth component, the processor can switch the first leg, the second leg, the third leg, the fourth leg, and the fifth leg of the call to the wideband codec audio communication.

The processor can receive an indication that the IVR is configured to operate in the wideband codec. The processor can establish a wideband codec audio communication associated with the first leg, the second leg, the third leg, the fourth leg, the fifth leg, and the sixth leg of the call. Upon transferring the call to the fifth component, the processor can establish the wideband codec audio communication associated with the seventh leg of the call.

Upon transferring the call to the fifth component, the processor can create multiple legs of the call leading to multiple endpoints, where a leg among the multiple legs leads to an endpoint among the multiple endpoints. At least one leg among the multiple legs can be configured to operate using the narrowband codec. Multiple legs of the call can include the seventh leg. The processor can copy data associated with the call into multiple copies, where each copy among the multiple copies corresponds to the leg among the multiple legs. The processor can convert a wideband codec audio communication associated with the data into a narrowband codec audio communication associated with the data. The processor can send the narrowband codec communication associated with the data on the at least one leg among the multiple legs.

The processor can record the call. Upon transferring the call to the fifth component, the processor can create a call recording leg, where the call recording leg aids in recording the call. The call recording leg is configured to reduce memory consumption by operating using the narrowband codec. The processor can convert the wideband codec audio communication into a narrowband codec audio communication. The processor can send the narrowband codec communication associated with the call on the call recording leg.

The processor can transcribe the call. Upon transferring the call to the fifth component, the processor can create an eighth leg of the call by routing the call from the call client platform to the SBC. The processor can create a ninth leg of the call by routing the call from the fourth component to a transcription service, where the transcription service operates using the narrowband codec. The processor can convert a wideband codec audio communication into a narrowband codec audio communication. The processor can send the narrowband codec communication to the transcription service.

The processor can enable a third party to join the call. Upon transferring the call to the fifth component, the processor can create an eighth leg of the call by routing the call from the call client platform to the SBC. The processor can create a ninth leg of the call by routing the call from the fourth component to a remote observer, where the ninth leg of the call operates using the narrowband codec. The processor can convert a wideband codec audio communication into a narrowband codec audio communication and can send the narrowband codec communication to the transcription service.

Computer System

Figure 5:
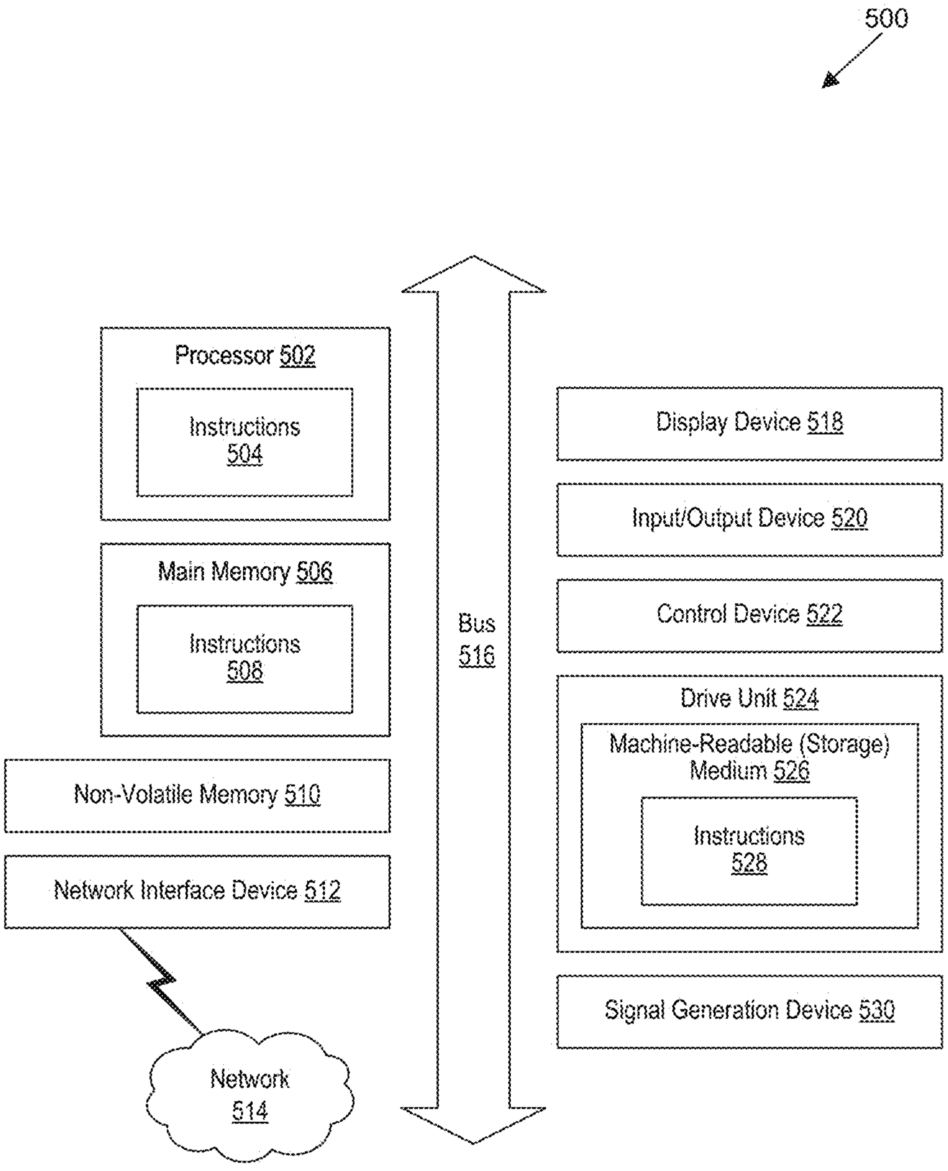
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530, which are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementations, the computer system 500 can be an embedded computer system, a system-on-chip (SOC), a single-board computer system, or a distributed system such as a mesh of computer systems or include one or more cloud components in one or more networks. Where appropriate, one or more computer systems 500 can perform operations in real time, near real time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A method comprising:

determining that a call associated with a communications network is directed to a communications network support center;

creating a first leg of the call by receiving the call at a first component associated with the communications network, wherein the first leg operates in a first codec;

creating a second leg of the call between the first component and an interactive voice response (IVR);

determining, by the IVR, that a user equipment (UE) is requesting to communicate with an agent associated with the communications network;

transferring the call from the IVR to the first component; and creating a third leg of the call by routing the call to the agent associated with the communications network, wherein the second leg of the call and the third leg of the call are branching legs, wherein the third leg operates in the first codec while enabling the second leg to use a second codec; and wherein the first codec uses a greater frequency range than the second codec.

2. The method of claim 1, further comprising:

configuring the first leg or the second leg to use the second codec; and upon transferring the call from the IVR to the first component, configuring the first leg and the third leg to use the first codec.

3. The method of claim 1, further comprising:

upon transferring the call from the IVR to the first component:

creating multiple legs of the call leading to multiple endpoints, wherein a leg among the multiple legs leads to an endpoint among the multiple endpoints, and wherein at least one leg among the multiple legs is configured to operate using the second codec;

copying data associated with the call into multiple copies, wherein each copy among the multiple copies corresponds to the leg among the multiple legs;

converting a first audio communication associated with the data into a second audio communication associated with the data, wherein the first audio communication uses the first codec and the second audio communication uses the second codec; and sending the second audio communication associated with the data on the at least one leg among the multiple legs.

4. The method of claim 1, further comprising:

upon transferring the call to the first component:

creating a call recording leg, wherein the call recording leg aids in recording the call, wherein the call recording leg is configured to use the second codec;

converting a first audio communication associated with the call into a second audio communication associated with the call, wherein the first audio communication uses the first codec and the second communication uses the second codec; and sending the second audio communication associated with the call on the call recording leg.

5. The method of claim 1, wherein the first leg of the call is created between a Session Border Controller (SBC) and the first component, and wherein the first component includes a call routing platform.

6. The method of claim 1, further comprising:

upon transferring the call to the first component, creating a fourth leg of the call by routing the call from the first component to a transcription service, wherein the transcription service operates using the second codec;

converting a first audio communication associated with the call into a second audio communication associated with the call, wherein the first audio communication uses the first codec and the second communication uses the second codec; and sending the second audio communication associated with the call to the transcription service.

7. The method of claim 1, further comprising:

upon transferring the call to the first component, create a fourth leg of the call by routing the call from the first component to a remote observer, wherein the fourth leg of the call operates using the second codec;

convert a first audio communication associated with the call into a second audio communication associated with the call wherein the first audio communication uses the first codec and the second communication uses the second codec; and send the second audio communication associated with the call to the remote observer.

8. At least one non-transitory, computer-readable storage medium storing instructions which, when executed by at least one data processor of a system, cause the system to:

determine, by a first component associated with a communications network, that a call is directed to a communications network support center;

create a first leg of the call by routing the call to a second component associated with the communications network;

create a second leg of the call by routing the call to an interactive voice response (IVR);

determine that a user equipment (UE) is requesting to communicate with an agent associated with the communications network;

transfer the call to the second component;

create a third leg of the call by routing the call to the agent associated with the communications network, wherein the second leg of the call and the third leg of the call are branching legs; and establish a first codec audio communication associated with the first leg and the third leg of the call while enabling the second leg to use a second codec audio communication, wherein the first codec audio communication uses a greater frequency range than the second codec audio communication.

9. The at least one non-transitory, computer-readable storage medium of claim 8, wherein the first component associated with the communications network includes a Session Border Controller (SBC), and wherein the second component associated with the communications network includes a call routing platform.

10. The at least one non-transitory, computer-readable storage medium of claim 8, comprising instructions to:

establish the second codec audio communication associated with the first leg and the second leg of the call; and upon transferring the call to the second component, switch the first leg and the third leg of the call to the first codec audio communication.

11. The at least one non-transitory, computer-readable storage medium of claim 8, comprising instructions to:

receive an indication that the IVR is configured to operate in the first codec;

establish the first codec audio communication associated with the first leg and the second leg of the call; and upon transferring the call to the second component, establish the first codec audio communication associated with the third leg of the call.

12. The at least one non-transitory, computer-readable storage medium of claim 8, comprising instructions to:
upon transferring the call to the second component, create multiple legs of the call leading to multiple endpoints,
wherein a leg among the multiple legs leads to an endpoint among the multiple endpoints,
wherein at least one leg among the multiple legs is configured to operate using the second codec;
copy data associated with the call into multiple copies,
wherein each copy among the multiple copies corresponds to the leg among the multiple legs;
convert the first codec audio communication associated with the data into the second codec audio communication associated with the data; and
send the second codec audio communication associated with the data on the at least one leg among the multiple legs.

13. The at least one non-transitory, computer-readable storage medium of claim 8, comprising instructions to:
upon transferring the call to the second component, create a call recording leg,
wherein the call recording leg aids in recording the call,
wherein the call recording leg is configured to use the second codec;
convert the first codec audio communication associated with the call into the second codec audio communication associated with the call; and
send the second codec audio communication associated with the call on the call recording leg.

14. The at least one non-transitory, computer-readable storage medium of claim 8, comprising instructions to:
upon transferring the call to the second component, create a fourth leg of the call by routing the call from the second component to the first component;
create a fifth leg of the call by routing the call from the first component to a transcription service,
wherein the transcription service operates using the second codec;
convert the first codec audio communication associated with the call into the second codec audio communication associated with the call; and
send the second codec audio communication associated with the call to the transcription service.

15. The at least one non-transitory, computer-readable storage medium of claim 8, comprising instructions to:
upon transferring the call to the second component, create a fourth leg of the call by routing the call from the second component to the first component;
create a fifth leg of the call by routing the call from the first component to a remote observer,
wherein the fifth leg of the call operates using the second codec;
convert the first codec audio communication associated with the call into the second codec audio communication associated with the call; and
send the second codec audio communication associated with the call to the remote observer.

16. A method comprising:
creating a first leg of a call by sending multiple packets of a call received from a mobile device to a mobile network core associated with a communications network;
determining that the call is directed to a communications network support center;
creating a second leg of the call by routing the call from the mobile network core to an Interconnect Session Border Controller (I-SBC) associated with the communications network,
wherein the I-SBC is peered with a Session Border Controller (SBC);
creating a third leg of the call by routing the call from the I-SBC to the SBC;
creating a fourth leg of the call by routing the call from the SBC to a call routing platform;
creating a fifth leg of the call by routing the call from the call routing platform to an interactive voice response (IVR);
determining by the IVR that the mobile device is requesting to communicate with an agent associated with the communications network;
transferring the call to the call routing platform;
creating a sixth leg of the call by routing the call from the call routing platform to the agent associated with the communications network,
wherein the fifth leg of the call and the sixth leg of the call are branching legs associated with the call routing platform; and
establishing a first codec audio communication associated with the first leg, the second leg, the third leg, the fourth leg, and the sixth leg of the call, while enabling the fifth leg to use a second codec audio communication,
wherein the first codec audio communication uses a greater frequency range than the second codec.

17. The method of claim 16, further comprising:
receiving an indication that the IVR is configured to operate in the second codec;
establishing a second codec audio communication associated with the first leg, the second leg, the third leg, the fourth leg, and the fifth leg of the call; and
upon transferring the call to the call routing platform, switching the first leg, the second leg, the third leg, and the fourth leg of the call to the first codec audio communication.

18. The method of claim 16, further comprising:
receiving an indication that the IVR is configured to operate in the first codec;
establishing the first codec audio communication associated with the first leg, the second leg, the third leg, the fourth leg, and the fifth leg of the call; and
upon transferring the call to the call routing platform, establishing the first codec audio communication associated with the sixth leg of the call.

19. The method of claim 16, further comprising:
upon transferring the call from the IVR to the call routing platform:
creating multiple legs of the call leading to multiple endpoints,
wherein a leg among the multiple legs leads to an endpoint among the multiple endpoints,
wherein at least one leg among the multiple legs is configured to operate using the second codec;
copying data associated with the call into multiple copies,
wherein each copy among the multiple copies corresponds to the leg among the multiple legs;
converting the first codec audio communication associated with the data into the second codec audio communication associated with the data; and
sending the second codec audio communication associated with the data on the at least one leg among the multiple legs.

20. The method of claim 16, further comprising:

upon transferring the call from the IVR to the call routing platform:

creating a call recording leg, wherein the call recording leg aids in recording the call, wherein the call recording leg is configured to use the second codec;

converting the first codec audio communication associated with the call into the second codec audio communication associated with the call; and sending the second codec audio communication associated with the call on the call recording leg.

* * * * *